United States Patent
Cook et al.

(10) Patent No.: US 8,288,893 B2
(45) Date of Patent: Oct. 16, 2012

(54) ADAPTIVE MATCHING AND TUNING OF HF WIRELESS POWER TRANSMIT ANTENNA

(75) Inventors: Nigel P. Cook, El Cajon, CA (US);
Lukas Sieber, Hamilton (NZ);
Hanspeter Widmer, Wohlenschwil (CH)

(73) Assignee: Qualcomm Incorporated, San Diego, CA (US)

( * ) Notice: Subject to any disclaimer, the term of this patent is extended or adjusted under 35 U.S.C. 154(b) by 172 days.

(21) Appl. No.: 12/505,353

(22) Filed: Jul. 17, 2009

(65) Prior Publication Data

US 2010/0117454 A1 May 13, 2010

Related U.S. Application Data

(60) Provisional application No. 61/081,719, filed on Jul. 17, 2008.

(51) Int. Cl.
*G05F 1/10* (2006.01)
(52) U.S. Cl. .......................................... 307/98
(58) Field of Classification Search .............. 307/98
See application file for complete search history.

(56) References Cited

U.S. PATENT DOCUMENTS

| | | | |
|---|---|---|---|
| 5,198,826 A | 3/1993 | Ito | |
| 6,830,193 B2 * | 12/2004 | Tanaka | 235/492 |
| 7,023,391 B2 | 4/2006 | Wuidart et al. | |
| 7,741,734 B2 | 6/2010 | Joannopoulos et al. | |
| 7,825,543 B2 | 11/2010 | Karalis et al. | |
| 7,899,425 B2 * | 3/2011 | Forster | 455/269 |
| 2002/0003498 A1 * | 1/2002 | Wuidart et al. | 343/700 |
| 2007/0024510 A1 * | 2/2007 | Ghabra et al. | 343/711 |

FOREIGN PATENT DOCUMENTS

| | | |
|---|---|---|
| EP | 1158603 A1 | 11/2001 |
| JP | 2004173293 | 6/2004 |
| WO | WO2007072381 A2 | 6/2007 |
| WO | WO2008094383 A1 | 8/2008 |

OTHER PUBLICATIONS

International Search Report and Written Opinion—PCT/US2009/051046, International Search Authority—European Patent Office—Oct. 16, 2009.

\* cited by examiner

*Primary Examiner* — Robert L. Deberadinis
(74) *Attorney, Agent, or Firm* — Knobbe Martens Olson & Bear LLP

(57) ABSTRACT

Exemplary embodiments of the invention s are directed to a wireless power system with different coupling loops, such as two loops. The coupling loops are switched. One can be used for vicinity coupling, e.g., greater than a distance away, the other for proximity coupling, e.g., less than a distance away.

52 Claims, 5 Drawing Sheets

ADAPTIVE MATCHING AND TUNING OF HF WIRELESS POWER TRANSMIT ANTENNA

The present Application for Patent claims priority to Provisional Application No. 61/081,719, entitled "ADAPTIVE MATCHING AND TUNING OF HF WIRELESS POWER TRANSMIT ANTENNA" filed Jul. 17, 2008, and assigned to the assignee hereof and hereby expressly incorporated by reference herein.

BACKGROUND

Previous applications assigned to this assignee describe magnetically resonant transfer of power between antennas. The antennas may be capacitively loaded wire loops or multi-turn coils. These form a resonant antenna that efficiently couples energy from a primary structure (a transmitter) to a distal positioned secondary structure (a receiver) via a magnetic field. Both primary and secondary are tuned to a common resonance frequency.

These previous applications describe a major issue of wireless power as electromagnetic interference and radiation exposure for human safety. Energy transfer via magnetic field coupling may be mainly constrained by the specified H-field limits. Compliance with these limits may be tested at a defined distance, e.g., 10 m, from the radiating structure.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The detailed description includes specific details for providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted from a transmitter to a receiver without the use of physical electromagnetic conductors.

Figure 1:
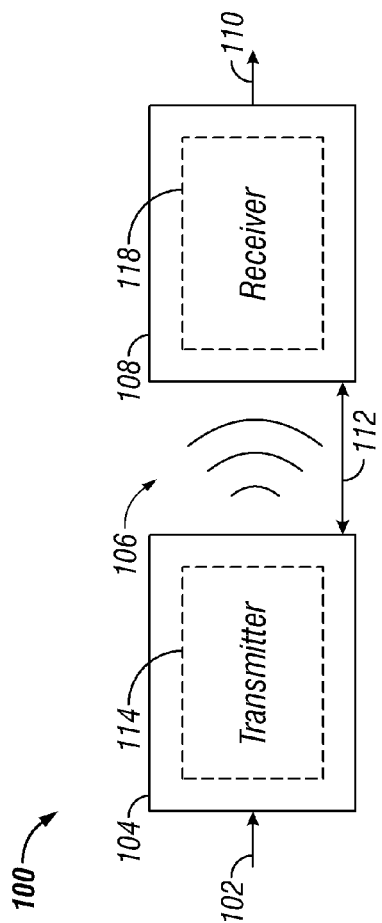
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. A coupling mode may be developed between the transmit antenna 114 and the receive antenna 118 when in this near-field. The area around the antennas 114 and 118 where this near-field coupling may occur is referred to herein as a coupling-mode region.

Figure 2:
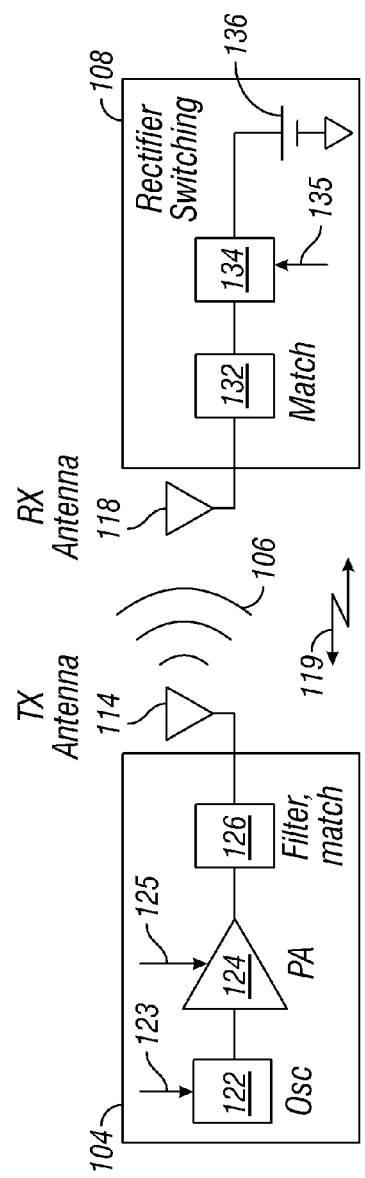
FIG. 2 shows a more detailed block diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator 122 is configured to generate at a desired frequency, such as 13.5 MHz, which may be adjusted in response to adjustment signal 123. An alternative uses LF frequencies, e.g., 135 KHz. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118.

Figure 3:
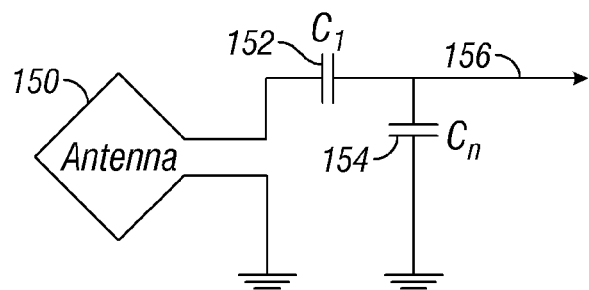
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Using a ferrite core may decrease the effect of extraneous objects. However, ferrite cores may need a certain length to be effective, which may be difficult when used in a vehicle. Air disk coils are considered more suitable for integration in car and for embedding in the ground. LF Ferrites may be used as magnetic shield to prevent fields generating eddy currents in metallic parts of the antenna surrounding.

Efficiency may be improved by keeping other devices outside of the core area. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems because magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

It should be noted that the foregoing approach is applicable to variety of communication standards such as CDMA, WCDMA, OFDM, and so forth. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Exemplary embodiments of the invention are directed to (or include) the following.

A wireless power antenna and its operation is disclosed. In an exemplary embodiment, the wireless power antenna is a high frequency ("HF") transmit antenna. By adjusting matching to the antenna from or to wireless power circuitry, this may enable this system to be used for both proximity and vicinity coupling.

A high Q HF transmit antenna usually has a very low series resonance-impedance. It has been believed that these antennas should not be fed directly from a power source, because the low impedance could prevent the transmitter system from working efficiently.

Our previous applications described use of a coupling. The coupling loop transforms the low impedance of the transmit antenna to a suitable impedance for the power source e.g. 5 to 50 Ohms.

In an exemplary embodiment, the loaded and unloaded Q will determine the size of the coupling for the transmit antenna. A larger coupling loop can be used to increase coupling efficiency to feed power to a loaded antenna. A smaller coupling loop in the same plane as the main resonator may be sufficient to feed power to an unloaded antenna.

For a vicinity system, the transmit antenna is nearly unloaded, so the Q is very high. A good antenna can achieve an unloaded Q for example between 800 and 1000. A smaller coupling loop in the same plane as the main resonator is sufficient to feed power to the unloaded antenna.

For a proximity system, the Q of the transmit antenna drops due to the strong coupling to the receiver and due to the eddy-current losses in the metallic parts of the receiver. The loaded Q can be in the range of 100 to 200. To feed power to the loaded antenna, a larger coupling loop may be advantageous increase the coupling to the antenna.

Figure 4:
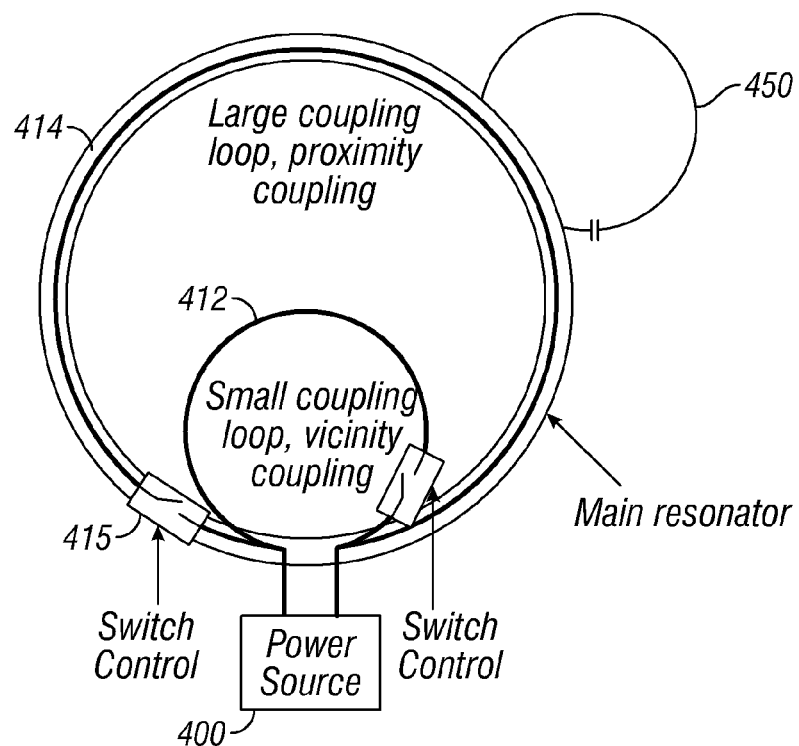
FIG. 4 shows a multiple part coupling loop.

A first exemplary embodiment is shown in FIG. 4 shows power source 400 as connected to a wireless power coupling loop 410. That coupling loop, in turn, couples to a wireless power antenna 450, which is magnetically resonant at the frequency of interest.

In an exemplary embodiment, the coupling loop 410 has two different coupling loops 412, 414 of different sizes. The coupling loops can separately be activated. In an embodiment as shown, the small coupling loop 412 is used for vicinity (distance) coupling. The larger coupling loop 414 is used for proximity (close up) coupling. Each of the coupling loops has an embedded switch. For example, the vicinity coupling loop 412 includes an embedded switch 413 which is remotely controllable by a controller that is associated with the power source. Analogously the larger coupling loop 414 includes a switch 415.

Only one of the switches 413 or 415 is closed at any one time. When a switch such as 415 is closed, this renders the loop 414 active, and the loop 412 inactive.

Figure 5:
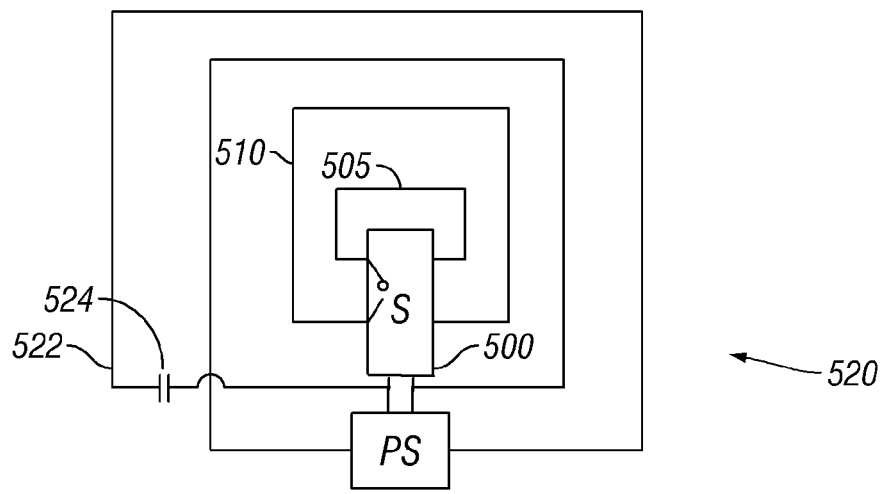
FIG. 5 shows an embodiment on a PC board.

In an exemplary embodiment, this coupling loop can be formed on a printed circuit board, as shown in the exemplary embodiment of FIG. 5. In this printed circuit board embodiment, a switch 500 controls which of the two coupling loops 505, 510 be used as the coupling loop to transmit or receive wireless power. The switched coupling loop 505 or 510 is then used to connect to the magnetically resonant antenna 520 formed of an inductive element 522 in series with a capacitor 524. While FIG. 5 shows an antenna 520 with two turns, it should be understood that the antenna can have any number of turns.

Figure 6:
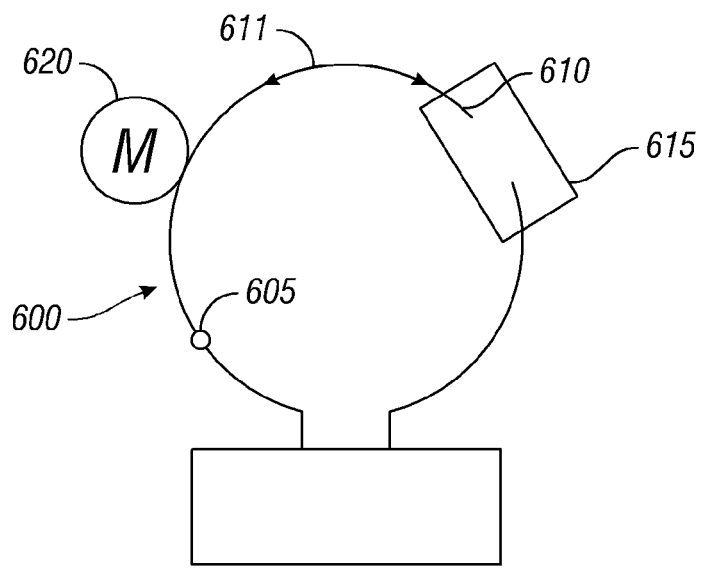
FIG. 6 shows a sliding part embodiment.

According to another exemplary embodiment, the coupling loop is mechanically resizable. For example, FIG. 6 shows a mechanically resizable coupling loop 600. A hinge 605 allows a portion of the coupling loop 610 to move backwards and forwards as shown by the arrows 611. This portion of the coupling loop is located on a contact pad 615 which extends over a remote area. In operation, a controllable mover 620, e.g. a motor or hydraulic device, can be used to move the portion 610 to make the coupling loop either larger or smaller as desired.

Figure 7:
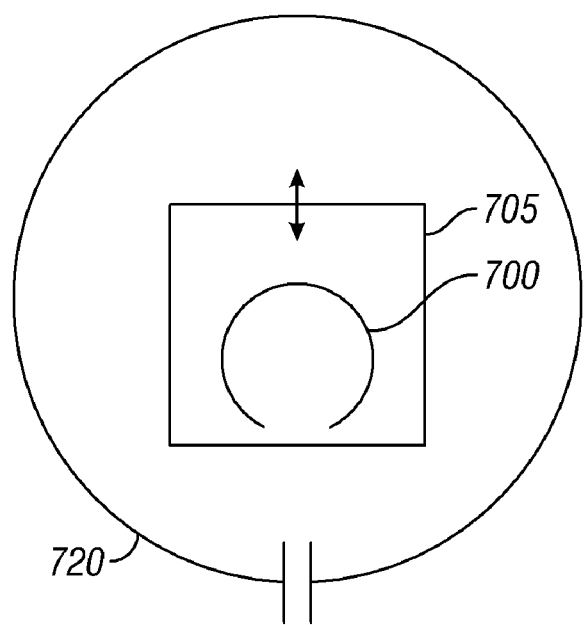
FIG. 7 shows a moving antenna embodiment.

FIG. 7 shows an alternative exemplary embodiment, in which the coupling loop 700 is located on a carrier 705. That carrier 705 can be moved by action of the mover 715. For example, the carrier 705 can be move towards or away from the main resonator 720. This has the effect of changing the coupling between the coupling loop 700 in the main resonator 720. In each of these exemplary embodiments, the mover can be electrical, pneumatic, or can use any other techniques.

In addition to matching to the transmit antenna being influenced by the position of the receiver, the resonance frequency can also be influenced. A device that is in close proximity to the coupling loop de-tunes the coupling loop due to its electrical and dielectric closeness. This in turn influences the inductance in capacitance of the transmit antenna.

Figure 8A:
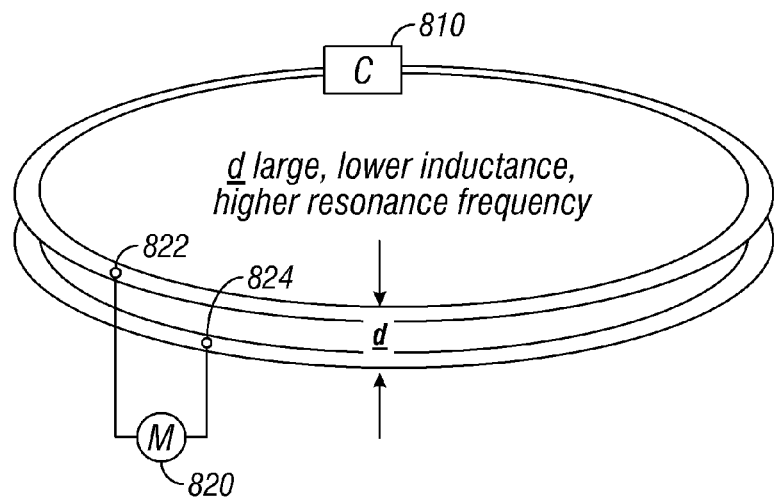
FIGS. 8A and 8B show a tunable solenoid.
Figure 8B:
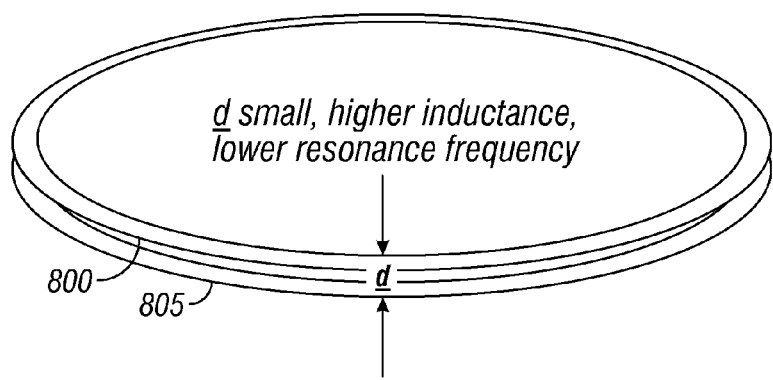

FIGS. 8A and 8B illustrate an embodiment which addresses this issue. In the embodiment of FIG. 8A, a solenoid antenna is used which has two turns 800, 805. The rear portion of the antenna may include a capacitor element 810 attached thereto, and may be stable or hinged. However, the front portion of the spiral antenna can be compressed and decompressed to change the distance d between the loops 800, 805. By compressing the two loops 800, 805 relative to one another, the inductance of this resonator increases, causing a lowered resonance frequency. Uncompressing these loops causes the inductance to decrease, alternatively raising the resonance frequency. This technique will allow a tuning range between 5 and 10%. In an embodiment, a mover 820 can be used to compress and decompress the loops. The mover can be a servomotor, pneumatic motor, or piezoelectric device, for example. This connects to the loops via brackets 822, 824.

In one exemplary embodiment, those brackets may be connected with Teflon to avoid changing the Q of the antenna. However, any material that does not destroy the high Q, typically a material with low dielectric losses, can be used for this purpose.

In an exemplary embodiment, the antenna itself 800, 805 is formed of copper, and the elasticity of the copper is used to change the distance between the two materials. FIG. 8B illustrates the antenna in its more compressed scenario, where there is a distance of d0 between the loops 800, 805.

While the above describes the use of two turns, the coil can be used with any number of turns. For example, this can be used with a five turn coil, while adjusting the spacing between only two of the loops.

These techniques can be used for transmit or receive antennas, and allow adapting to multiple load situations and can be used for both, proximity and vicinity power transfer.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A transmitter system for wireless power, comprising:
   an antenna resonant at a first frequency; and
   a coupling loop assembly comprising:
      a first coupling loop;
      a first switch configured to activate said first coupling loop;
      a second coupling loop; and
      a second switch configured to activate said second coupling loop, the coupling loop assembly configured to couple with said antenna via magnetic induction.

2. A system as in claim 1, further comprising a controller configured to detect a coupling to the antenna, and to select either said first coupling loop or said second coupling loop based on said coupling.

3. A system as in claim 2, wherein said controller is configured to detect proximity coupling and to select said first coupling loop upon detecting proximity coupling.

4. A system as in claim 2, wherein said controller is configured to detect vicinity coupling and to select said second coupling loop upon detecting vicinity coupling.

5. A system as in claim 2, wherein said antenna includes multiple loops.

6. A system as in claim 5, further comprising a mechanism configured to adjust the position of said multiple loops relative to one another.

7. A system as in claim 2, wherein said coupling loop assembly is unconnected to said antenna.

8. A system as in claim 1, wherein said coupling loops are formed on a printed circuit board.

9. A system as in claim 1, wherein said antenna comprises multiple loops.

10. A system as in claim 9, further comprising a mechanism configured to adjust the position of said multiple loops relative to one another.

11. A transmitter system as in claim 1, further comprising a first circuit coupled to said antenna, and configured to cause production of a signal at the first frequency.

12. A system as in claim 1, further comprising a mechanism configured to adjust the position of said coupling loops relative to one another.

13. A receiver system for wireless power, comprising:
   a circuit configured to receive a signal at a first frequency and to produce an electrical output based on said first frequency;
   an antenna resonant at said first frequency; and
   a coupling loop assembly comprising:
      a first coupling loop;
      a first switch configured to activate said first coupling loop;
      a second coupling loop; and
      a second switch configured to activate said second coupling loop.

14. A system as in claim 13, further comprising a controller configured to detect a coupling to the antenna, and to select either said first coupling loop or said second coupling loop based on said coupling.

15. A system as in claim 14, wherein said controller is configured to detect proximity coupling and to select said first coupling loop upon detecting proximity coupling.

16. A system as in claim 14, wherein said controller is configured to detect vicinity coupling and to select said second coupling loop upon detecting vicinity coupling.

17. A system as in claim 14, wherein said antenna includes multiple loops.

18. A system as in claim 17, further comprising a mechanism configured to adjust the position of said multiple loops relative to one another.

19. A system as in claim 14, wherein said coupling loop assembly is unconnected to said antenna and coupling between said coupling loop assembly and said antenna is performed via magnetic induction.

20. A system as in claim 13, wherein said coupling loops are formed on a printed circuit board.

21. A system as in claim 13, wherein said antenna includes multiple loops.

22. A system as in claim 21, further comprising a mechanism configured to adjust the position of said multiple loops relative to one another.

23. A system as in claim 13, further comprising a mechanism configured to adjust the position of said coupling loops relative to one another.

24. An antenna, comprising:
   multiple loops forming an inductive part;
   a capacitor, in series with said multiple loops; and
   a mover, configured to move said multiple loops relative to one another, changing a resonance frequency of said antenna.

25. A system as in claim 24, wherein said mover comprises an electric motor.

26. A system as in claim 24, wherein said mover comprises a pneumatic motor.

27. A system as in claim 24, wherein said mover comprises a piezoelectric device.

28. A method of coupling electric power, comprising:
   adjusting a coupling loop to transfer power via a first field upon detecting wireless power transfer via the first field between a pair of devices separated by less than a distance; and
   adjusting the coupling loop to transfer power via a second field upon detecting wireless power transfer via the second field between the pair of devices separated by more than the distance.

29. A method as in claim 28, wherein said adjusting comprises switching to use a second coupling loop rather than the coupling loop.

30. A method as in claim 28, wherein adjusting comprises changing the size of the coupling loop.

31. A method as in claim 28, wherein adjusting comprises adjusting the position of the coupling loop relative to a second coupling loop.

32. The method as in claim 28, wherein the first field comprises a near-field.

33. The method as in claim 28, wherein the second field comprises a far-field.

34. A system comprising:
   means, resonant at a first frequency, for transmitting or receiving wireless power; and means for coupling wireless power to and from said means for transmitting or receiving, said coupling means including:
  means for a first coupling of wireless power to said means for transmitting or receiving;
  means for activating said first coupling means;
  means for a second coupling of wireless power to said means for transmitting or receiving wireless power; and
  means for activating said second coupling means.

35. A system as in claim 34, further comprising means for detecting a coupling to the means for transmitting or receiving wireless power, and selecting either said first coupling means or said second coupling means based on said detected coupling.

36. A system as in claim 35, wherein said means for detecting a coupling detects proximity coupling and selects said first coupling means upon detecting said proximity coupling.

37. A system as in claim 35, wherein said means for detecting a coupling detects vicinity coupling and selects said second coupling means upon detecting said vicinity coupling.

38. A system as in claim 34, wherein said first and second coupling means are formed on a printed circuit board.

39. A system as in claim 34, wherein said means for transmitting and receiving comprises multiple loops.

40. A system as in claim 39, further comprising means for adjusting the position of said multiple loops relative to one another.

41. A system as in claim 34, further comprising means for adjusting the position of said first and second coupling means relative to one another.

42. An antenna comprising:
  means for producing inductive coupling;
  means for adjusting a capacitance coupled in series with said means for producing inductive coupling; and
  means for moving said means for inductive coupling, the means for moving configured to adjust a resonant frequency of the antenna based on a position of said means for producing inductive coupling.

43. A method of transmitting wireless power comprising:
  detecting coupling to an antenna;
  selecting a coupling loop based on said detected coupling; and
  transferring wireless power from said coupling loop to said antenna via magnetic induction.

44. The method of claim 43, wherein detecting coupling comprises detecting proximity coupling.

45. The method of claim 43, wherein detecting coupling comprises detecting vicinity coupling.

46. The method of claim 43, wherein selecting a coupling loop comprises switching from another coupling loop to the selected coupling loop.

47. The method of claim 43, wherein selecting a coupling loop comprises adjusting a size of the selected coupling loop.

48. A method of receiving wireless power comprising:
  detecting coupling to an antenna;
  selecting a coupling loop based on the detected coupling;
  receiving wireless power from the coupling loop at said antenna via magnetic induction; and
  producing an electrical output based on said received wireless power.

49. The method of claim 48, wherein detecting coupling comprises detecting proximity coupling.

50. The method of claim 48, wherein detecting coupling comprises detecting vicinity coupling.

51. The method of claim 48, wherein selecting a coupling loop comprises switching from another coupling loop to the selected coupling loop.

52. The method of claim 48, wherein selecting a coupling loop comprises adjusting a size of the selected coupling loop.

* * * * *